United States Patent [19]

Savin

[11] Patent Number: 4,931,491
[45] Date of Patent: Jun. 5, 1990

[54] COATING COMPOSITION EXHIBITING IMPROVED RESISTANCE TO ENVIRONMENTAL ATTACK

[76] Inventor: Ronald R. Savin, 10448 Chester Rd., Cincinnati, Ohio 45215

[21] Appl. No.: 276,397

[22] Filed: Nov. 25, 1988

[51] Int. Cl.$^5$ ............................................. C08K 3/36
[52] U.S. Cl. .................................. 523/443; 524/407; 524/492; 524/493
[58] Field of Search ............... 523/443; 524/492, 493, 524/407

[56] References Cited

U.S. PATENT DOCUMENTS

| | | | |
|---|---|---|---|
| 4,075,153 | 2/1978 | Leo | 523/443 |
| 4,342,674 | 8/1982 | Morgan | 523/443 |
| 4,847,122 | 7/1989 | Goldberg et al. | 523/443 |

Primary Examiner—Lewis T. Jacobs
Attorney, Agent, or Firm—Frost & Jacobs

[57] ABSTRACT

A coating composition for the protection of substrates against environmental attack, comprising, in weight percent, from about 10% to about 30% of a film-forming polymer which is liquid at room temperature in the presence of not more than 25% solvents; up to about 20% of a corrosion inhibiting agent such as metal chromates, metal phosphates and/or metal molybdates; from 2% to about 5.5% of an amorphous pyrogenic silica having an average particle size less than 0.01 micron; from about 20% to about 50% of a crystalline silica having an oil absorption value of less than 20 measured by ASTM standard test D281-84; not greater than 25% of at least one solvent compatible with the polymer. The composition has a viscosity suitable for application by conventional equipment while also having a low volatile organic content.

23 Claims, No Drawings

COATING COMPOSITION EXHIBITING IMPROVED RESISTANCE TO ENVIRONMENTAL ATTACK

FIELD OF INVENTION

This invention relates to a coating composition, and to a method for preparation thereof, which provides improved resistance to environmental attack utilizing conventional binders, by incorporation of high levels of both crystalline and micro particle silicas. The invention achieves improved corrosion resistance, either with or without the presence of corrosion inhibiting agents, in binder systems containing epoxy, phenoxy, urethane, vinyl chloride, acrylic, polyester, or alkyd type polymers. Although not so limited, the invention has particular utility as an epoxy-based primer coating composition for aircraft and aerospace vehicles which exhibits greatly improved saltspray resistance and compatibility with existing polyurethane topcoats in the aircraft industry, while at the same time meeting the increasingly stringent requirements for low volatile organic content (VOC) imposed by federal and state regulatory agencies.

BACKGROUND OF THE INVENTION

Primer coats for aircraft are required to withstand 3000 hours saltspray resistance with a deposition of about 15 microns (about 0.6 mil), and to avoid osmotic blister formation when topcoated and subjected to 168 hours immersion in water at 150° F. (about 65° C.). This is referred to as compatibility. Osmotic blisters are caused by a rapid loss of weight as the corrosion inhibiting agents dissolve, leaving numerous voids in the primer coating which result in a collapse of the topcoat. Saltspray resistance is determined by the test set forth in Northrop Corporation Material Specification NAI-1269 Revision G.

Since conventional aircraft primers contain corrosion inhibiting pigments such as chromates of zinc, strontium, cobalt and/or barium, zinc phosphate, and the like, it has been necessary for the prior art to use an epoxy polymer of relatively high molecular weight, which is solid at room temperature, in order to cause the metal chromates to dissolve or "leach" gradually during the 168 hours water immersion test at 150° F., or the comparable test of condensing humidity for 1550 hours at 120° F. (about 50° C.). These medium to high molecular weight epoxy polymers used in the prior art require relatively high levels of VOC, well above the current permissible maximum of 340 grams per liter.

United States Pat. No. 3,954,693, issued May 4, 1976, to C.C. Fong, is representative of prior art coating compositions for aircraft utilizing an epoxy resin binder with a polyisocyanate hardener of specific type, pigments such as zinc, cobalt, and strontium chromates, a suspending agent which may comprise pyrogenic silica in amounts up to 4% by weight of the epoxy resin, a catalyst, an epoxy-containing silane as a coupling agent, and volatile organic solvents ranging from about 40% to about 85% by volume of the composition. In all specific examples, the total solvent content was at least 40%.

In order to attain the higher solids levels needed to meet the low VOC requirements, a relatively low molecular weight epoxy polymer is required which is liquid at room temperature. However, the lower molecular weight of liquid epoxy polymers permits rapid leaching of the corrosion inhibiting agents (chromates and the like), thereby reducing saltspray resistance and causing blistering when topcoated with polyurethane and immersed in water at 150° F. for 168 hours.

This dilemma has made it impossible for conventional coating compositions simultaneously to meet the saltspray resistance and 150° F. water immersion tests and to comply with the low VOC requirements. Consequently, the aircraft and aerospace industry has been operating under a waiver of the low VOC requirement, pending development of a primer composition which would effectively meet all requirements.

The above problems are further complicated by recent restrictions on the use of zinc and strontium chromates due to the carcinogenic nature thereof. Moreover, zinc phosphate has been found to be less effective as a corrosion inhibiting agent in conventional compositions.

It is known that the length of path which moisture must diffuse to penetrate a protective coating on a metal surface is greater for lamellar or flakelike pigment particles than a coating containing amorphous pigment particles. The platelike pigment structure provides a tight film barrier which inhibits the passage of moisture and atmospheric contaminants.

Naturally occurring metal oxides, such as micaceous iron oxide with particle sizes ranging from about 15 to 100 microns, have been applied with about 20 layers of interleaved lamellar particles (about 5 mils in thickness) to form a layered protective coating which is extremely moisture resistant. However, this prior art type of pigmentation is not suitable in protective coatings for aircraft, automotive components and electrical equipment, since such products must be coated in production lines with depositions between about 0.5 and 1.5 mils (12.5 and 40 microns) in thickness. In order to obtain a smooth topcoat of about 6 to 8 Hegman gauge, it is essential that the primer be milled to a fine grind. Consequently, the penetration of moisture must be inhibited by pigmentation other than a high build, rough lamellar particle interleave.

It is, therefore, evident that a genuine need exists for coatings of all conventional types which exhibit improved resistance against environmental attack and, in particular, primer coatings in the aircraft and aerospace field.

SUMMARY OF THE INVENTION

It is an object of the invention to provide a coating composition using a conventional binder which exhibits improved resistance to environmental attack.

It is a further object of the invention to provide a coating composition having an epoxy, polyurethane/polyester binder and corrosion inhibiting agents for use in the aircraft industry, which exceeds the saltspray and hot water test requirements while at the same time meeting the low VOC requirements currently in effect and having a viscosity suitable for deposition by conventional equipment.

According to the invention, there is provided a coating composition for the protection of substrates against environmental attack, comprising, in weight percent, from about 10% to about 30% of a film-forming polymer which is liquid at room temperature in the presence of not more than 25% by weight solvents; up to about 20% of a corrosion inhibiting agent selected from the group consisting of metal chromates, metal phosphates, metal molybdates, and mixtures thereof; from 2% to about 5.5% of an amorphous pyrogenic silica having an average particle size less than 0.01 micron; from about 20% to about 50% of a crystalline silica having an oil absorption value of less than 20 measured by ASTM Standard Test D 281-84; and not greater than 25% of at least one solvent compatible with the polymer, the composition having a viscosity suitable for application of coatings by conventional equipment.

The invention further provides a two component coating composition for the protection of substrates against environmental attack having particular utility as a primer for aircraft and aerospace vehicles, the composition after admixture having a viscosity suitable for deposition of coatings by conventional equipment, comprising, in weight percent based on the total weight of the composition after admixture, from about 10% to about 30% of a film-forming epoxy polymer, the polymer being liquid at room temperature; from about 5% to about 30% of a crosslinking agent for the epoxy polymer; up to about 20% of a corrosion inhibiting agent selected from the group consisting of metal chromates, metal phosphates, metal molybdates, and mixtures thereof; from 2% to about 5.5% amorphous pyrogenic silica having an average particle size less than 0.01 micron; from about 20% to about 50% of a crystalline silica having an oil absorption value of less than 20 measured by ASTM Standard Test D281-84; and not greater than 25% of at least one organic solvent compatible with the epoxy polymer and the crosslinking agent.

According to the invention, there is provided a method for preparation of the coating composition defined above which has a viscosity suitable for application by conventional equipment, comprising the steps of mixing the ingredients with very slow agitation in low shear milling equipment, limiting the temperature increase to a minimum, in the absence of additives which tend to increase viscosity, and using highly polar hydrogen bonding solvents.

DETAILED DESCRIPTION OF THE INVENTION

The present invention is based on the concept that improved resistance against environmental attack can be achieved by providing a physical or "mechanical" screen within the deposited coating which virtually inhibits the passage of water, saltspray, moisture resulting from humidity, and the like, into and through the coating and ultimately, into contact with the substrate. A screen of this type would control the leaching of corrosion inhibiting agents such as metal chromates, phosphates and molybdates. Numerous types of pigments were tested for this purpose, including hydrophobic silica (silane treated silica), large amounts of relatively small particle size silica, talcs, diatomaceous earth, magnesium silicates, aluminum silicates, and similar materials. All such materials were unsuccessful. The most common silica used in the paint industry, having an average particle size of about 0.012 micron, rapidly failed the 168 hour 150° F. water immersion test, even when present in an amount of 10% by weight of the composition.

It was found that the pigments listed above, when incorporated in sufficient quantity to block the passage of moisture effectively, have oil absorption levels which render the coating short or "cheesy" and hence ineffective as a moisture barrier when deposited in films of about 0.5 to 1.5 mils thickness. In accordance with the present invention, it has been determined that up to 55% by weight of the dried film can comprise a crystalline silica having an oil absorption value of less than 20 without degrading the coating. Levels of about 30% to about 50% by weight of this silica in a dry organic coating (without corrosion inhibiting agents present) greatly reduce penetration of moisture into the film. However, when incorporating such crystalline silica into the low molecular weight epoxy or polyurethane resins needed to meet the low VOC requirements for aircraft and aerospace primers, the leaching or solubilization of corrosion inhibiting agents (such as metal chromates and molybdates) required by government specifications is substantially increased, with the result that osmotic blister formation occurs when topcoated and subjected to the above-described 168 hour water immersion test at 150° F. This problem is solved in the present invention by inclusion of a secondary pigment to block the moisture penetration not contained by the crystalline silica of low oil absorption value.

More specifically, it has been found that with the addition of 2% to about 5.5% by weight (based on the total weight of the composition) of an amorphous pyrogenic silica having an average particle size of less than 0.01 micron along with crystalline silica, virtually all moisture is blocked from penetrating the film, producing a very slow leaching of corrosion inhibiting agents. Saltspray resistance over aircraft aluminum substrates reaches levels in excess of 10,000 hours with no damage to the metal substrates, and development of osmotic blisters in the topcoats is prevented substantially beyond the 168 hours required by the standard test.

These improved results are also attained without the presence of corrosion inhibiting agents in the coating composition.

In initial tests, addition of greater than about 5% (based on the weight of the hardener side) amorphous pyrogenic silica having an average particle size less than 0.01 micron to the hardener side of a two component composition having a liquid epoxy polYmer binder resulted in a viscosity after admixture which was far too high for application by conventional equipment, when following the recommendations of the producers of pyrogenic silica for incorporation of such silica into coating compositions. This problem was overcome by addition of the silica within the range of 4% to about 8% based on the weight of the hardener side, in accordance with the method of the invention in a manner described in greater detail hereinafter. By following the method of the invention, the hardener, or B side, has a viscosity of about 70-75 Kus. After admixture with the epoxy, or A side, the resultant viscosity is about 25 seconds in a Zahn No. 2 cup, with a VOC not greater than 25% by weight. At this low viscosity, a deposition of 0.5 to 0.7 mil thickness can readily be applied by conventional spray coating.

In the case of a two component composition having a urethane/polyester binder, the amorphous pyrogenic silica is added to the "A" side (containing the polyol or polyester) since the "B" side containing the polyisocyanate does not readily wet the silica, and the silica is unstable in the presence of isocyanate groups. In such a system, from 3% to about 6% amorphous silica, based on the weight of the "A" side, is added.

The broad range, based on the total weight of the composition after admixture, of the amorphous pyrogenic silica of less than 0.01 micron average particle size is from about 2% to about 5.5%. A preferred range is from about 2.5% to about 5%. This encompasses both epoxy and urethane binders.

A minimum of 2% by weight, based on the total weight of the composition, of an amorphous pyrogenic silica having an average particle size less than 0.01 micron, in combination with about 20% to about 50% by weight (based on the total weight of the composition) of crystalline silica having an oil absorption value of less than 20, is thus considered to be critical in the composition of the present invention. The maximum amount of amorphous pyrogenic silica is not critical and is dictated primarily by the viscosity desired in the admixed composition. The maximum may be 5.5% by weight of the total composition for epoxy and urethane binders.

In a coating composition in accordance with the invention, a film-forming polymer which is liquid at room temperature, when dissolved in not more than 25% by weight solvents, is present within the range of from about 10% to about 30% by weight and preferably from about 20% to about 30%. The polymer may be an epoxy, phenoxy, urethane, vinyl chloride, acrylic, polyester, or alkyd type resin. As is known in the art, epoxy, phenoxy, urethane and vinyl chloride polymers coreacted with blocked or unblocked polyisocyanates, or melamines, may be either two component or one component systems. Epoxy polymers useful in the invention preferably contain at least one epoxy function per molecule with the formula

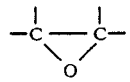

Typical epoxy polymers include the reaction product of an epihalohydrin, e.g., epichlorohydrin, and a polyol such as glycerol, a polyphenol or a bis-hydroxyphenyl alkane, e.g. bisphenol-A. The molecular weight is within a range which renders the polymer liquid at room temperature.

Shell 828, produced by Shell Oil Company, has been found to be a satisfactory low molecular weight epoxy polymer. Other equivalent epoxy polymers are commercially available.

Vinyl chloride can be coreacted with blocked or unblocked polyisocyanates, or melamines, as is known in the art.

Suitable vinyl copolymers which are solid at room temperature are commercially available. These will be liquid at room temperature by addition of less than 25% by weight solvents.

Urethane, acrylic, polyester, or alkyd type polymers which either are liquid at room temperature, or are rendered liquid by less than 25% solvents, are also commercially available, and the manner of production thereof is known in the art. Urethane polymers are produced by reaction of a polyisocyanate with a polyol, usually in the presence of an organometal catalyst, as taught in U.S. Pat. No. 3,725,355, issued Apr. 3, 1973, to D.B. Parrish et al., the disclosure of which is incorporated by reference.

Crosslinking agents or hardeners for epoxy resins include at least one compound with an —NH$_2$, —CONH$_2$, —NHR, —CONHR, and/or —COOH functional group, which react with the epoxy function, as is well known. The preparation of epoxy resins and crosslinking reactions are described in the above-mentioned U.S. Pat. No. 3,954,693, and this disclosure is incorporated by reference. Preferably aliphatic or aromatic polyamides are used as crosslinking agents. The weight ratio of epoxy polymer to hardening agent preferably ranges from about 3:1 to about 1:1. The crosslinking agent may range from about 5% to about 30% by weight of the total composition, and preferably from about 10% to about 20%.

Suitable commercially available polyamides include Versamid and Uredur, sold by Schering, and equivalents.

As indicated above, up to 20% of at least one particulate corrosion inhibiting agent may be present in the coating composition of the invention, selected from the group consisting of metal chromates, metal phosphates, metal molybdates, and mixtures thereof. Conventional corrosion inhibiting pigments include zinc, strontium, cobalt, and barium chromates, although the carcinogenic nature of zinc and strontium chromates has made their use undesirable. Metal molybdates such as zinc molybdate, are preferred corrosion inhibiting pigments. Zinc, strontium or chromium phosphates are also used conventionally as corrosion inhibiting agents. Metal oxides may also be added to obtain a desired color.

Pyrogenic amorphous silica having an average particle size less than 0.01 micron is produced from specific treatments such as high temperature hydrolysis of silicon tetrachloride or from transformation of silica in an electric arc. Suitable silicas having the required microparticle size include those marketed under the trademarks "Aerosil 300" and "Aerosil 976" by Degussa, and "Cabosil" by Cabot Corporation. "Aerosil 300" has an average particle size of about 0.007 micron.

The composition of the present invention requires a crystalline silica having an oil absorption value of less than 20 measured by ASTM standard test D281-84. This crystalline silica is present in an amount ranging from about 20% to about 50% by weight of the total composition (or about 25% to about 60% by weight of the solids), and preferably from about 25% to about 45% by weight of the total composition. In a two component epoxy system, the crystalline silica may be present in both components. A natural crystalline silica sold under the trademark NOVACITE by Malvern Minerals Company, has been found to be suitable. It has an oil absorption value less than 20. A silane-treated crystalline silica sold under the trademark NOVAKUP by Malvern Minerals Company is also suitable.

The ASTM D281-84 standard test method for oil absorption of pigments by spatula rub-out is as follows:

1g (or any multiple thereof) of thoroughly mixed and air dried pigment is placed on a smooth glass plate or marble slab. Raw linseed oil (conforming to specification D234 except having an acid number of 3±1) is added gradually, drop by drop (by means of a dropping bottle fitted with ground-in pipet and rubber bulb, or buret graduated in 0.1 ml divisions) to the pigment. After the addition of each drop, the oil is thoroughly incorporated by rubbing up with a sharp-edged steel spatula. The end point is reached when exactly enough oil has been incorporated with the pigment to produce a very stiff, putty-like paste which does not break or separate. Oil absorption value is reported as the number of pounds (grams) of oil required to wet exactly 100 pounds (grams) of pigment.

Organic solvents which are compatible with epoxy polymer and the hardening agent and with polyurethane and polyester include ketones such as methylethylketone, methylpropylketone, methylisobutylketone, methylamylketone, and cyclohexanone; alcohols such as butanol and isopropanol; esters such as butyl and amyl acetates; and aromatic solvents such as toluene and xylene. As indicated above, not more than 25% by weight of such volatile organic solvents are present in the composition of the invention, and preferably from about 10% to less than 25% of at least one of the above solvents is present, based on the total weight of the composition.

It is preferred that a coupling agent such as a silane and/or an organo-silicon compound having an epoxy group be present in the composition in order to improve adhesion of the coating to the substrate. Up to 2% of such a coupling agent may be present.

When using an epoxy polymer, a conventional catalyst may be added to accelerate the reaction between the polymer and the crosslinking agent. The catalyst may be an organometallic compound, an amine, and/or a polyamine, in an amount ranging from about 0.1% to about 10% by weight based on the weight of the epoxy polymer, preferably up to 5% based on the total weight of the composition.

A preferred two component coating composition in accordance with the invention thus comprises, in weight percent based on the total weight of the composition after admixture:

from about 20% to about 30% of an epoxy polymer having at least one epoxy function per molecule, the epoxy polymer being liquid at room temperature;

from about 10% to about 20% of a polyamide crosslinking agent for the epoxy polymer;

from about 10% to about 20% of a corrosion inhibiting pigment selected from the group consisting of cobalt chromate, strontium chromate, barium chromate, zinc molybdate, and mixtures thereof;

from about 2.5% to about 5% amorphous pyrogenic silica having an average particle size less than 0.01 micron;

from about 30% to about 45% crystalline silica having an oil absorption value of less than 20 measured by ASTM standard test D281-84;

up to 2% of a coupling agent selected from the group consisting of a silane, an organo-silicon compound having an epoxy function, and mixtures thereof;

up to 5% of a catalyst selected from the group consisting of an organometallic compound, an amine, a polyamine, and mixtures thereof; and from about 10% to less than 25% of volatile organic solvents selected from the group consisting of methylethylketone, methylpropylketone, methylisobutylketone, methylamylketone, cyclohexanone, butanol, isopropanol, toluene, xylene, and mixtures thereof.

A two component urethane binder coating composition in accordance with the invention comprises, in weight percent based on the total weight of the composition after admixture:

from about 10% to about 30% of a film-forming polyol-containing polyester;

from about 10% to about 30% of an isocyanate polymer as a crosslinking agent, the isocyanate polymer being liquid at room temperature in the presence of not more than 25% by weight solvents;

up to about 20% of a corrosion inhibiting agent selected from the group consisting of metal chromates, metal phosphates, metal molybdates, and mixtures thereof;

from 2% to about 5.5% of an amorphous pyrogenic silica having an average particle size less than 0.01 micron;

from about 20% to about 50% of a crystalline silica having an oil absorption value of less than 20 measured by ASTM standard test D281-84; and not greater than 25% of at least one organic solvent compatible with the polyester and the isocyanate polymer.

Any one or more of the preferred ranges indicated above can be used with any one or more of the broad ranges for the remaining components set forth above.

As indicated above, it has been found that the amorphous pyrogenic silica should be incorporated into the composition in a manner contrary to the accepted practice, in order to avoid increasing the viscosity to an impractible level. In this connection, it should be recognized that fumed amorphous silica is normally used in paint formulations (in amounts up to about 1%) in order to increase viscosity and to prevent settling. In contrast to this, in this invention the very fine amorphous silica is used to block moisture penetration.

The recommendations of producers of amorphous pyrogenic silica for incorporation thereof in paints are as follows:

(1) add with very rapid agitation;
(2) apply heat;
(3) use additives (such as fluorocarbon wetting agents) which increase viscosity;
(4) use low polar hydrogen bonding solvents; and
(5) mix with high shear milling equipment (e.g. sand mills or stone mills).

The method of the present invention for preparing the compositions described above, either as a single component or as a two component system, includes the steps of mixing the ingredients with very slow agitation in low shear milling equipment such as dissolvers and pebble mills, limiting the temperature increase to a minimum (i.e., with no heat applied to the mixture), in the absence of additives which tend to increase viscosity, adding only minimum proportions of low polar hydrogen bonding solvents such as aromatic compounds, chlorinated hydrocarbons and mineral spirits and large proportions of highly polar solvents such as ketones and alcohols.

When preparing a two component epoxy resin binder composition the amorphous pyrogenic silica is added to the hardener or B side along with the crosslinking agent, preferably part of the crystalline silica and solvents such as alcohols and ketones, in accordance with the steps set forth above.

When preparing a two component urethane/polyester resin binder composition the amorphous pyrogenic silica is added to the polyester (or polyol) A side along with the corrosion inhibiting agent (if present), at least part of the crystalline silica and solvents such as ketones, acetates, esters, and aromatic solvents, in accordance with the steps set forth above.

Coatings of the present composition may be applied by conventional equipment, including airless and electrostatic spray, dip, flowcoat, and roller coating, to obtain dried coating layers having a thickness ranging between about 10 and about 100 microns without the appearance of runs. All compositions are recoatable within 30 minutes after application and indefinitely thereafter without subsequent loss of adhesion. The flexibility of coatings is sufficient to permit later forming of the substrate into parts for various manufacturing operations. Adhesion to aluminum substrates is excellent.

The following specific examples are given to illustrate various embodiments of the coating compositions of the present invention. They are not to be construed as limitations on the invention herein claimed.

EXAMPLE 1

Two phases (A and B) of a coating composition in accordance with the invention were prepared by separately mixing the components set forth under (A) and (B) respectively, with the amounts expressed in percent by weight based on the total weight after admixture.

| Phase A | |
|---|---|
| Epoxy polymer - Shell 828 | 13.55% |
| Strontium chromate J-1365 | 12.52% |
| Crystalline silica NOVACITE 1250 | 10.42% |
| Talc MP-1250 | 2.08% |
| Anti-foaming agent BYK-300 | 0.12% |
| Solvent-methylisobutyl ketone | 6.08% |
| Solvent-methylethyl ketone | 6.08% |
| Phase B | |
| Polyamide hardener-Sylvamid 300 | 13.59% |
| Titanium dioxide pigment | 2.08% |
| Talc MP-1250 | 7.30% |
| Crystalline silica NOVAKUP 1250 (silane-treated silica) | 6.25% |
| Crystalline silica NOVACITE 1250 | 7.30% |
| Amorphous silica AEROSIL 300 | 2.50% |
| Solvent - xylol | 8.10% |
| Solvent - butanol | 2.03% |

Phase B was prepared by mixing with very slow agitation in a pebble mill, with no heat applied and with no additives such as fluorocarbon wetting agents.

The two phases were then admixed in approximately 1:1 proportions by weight. The admixture had a viscosity of about 25 seconds in a Zahn No. 2 cup.

Aircraft aluminum panels were sprayed with the admixture to provide a dried coating of less than 1 mil thickness. The coating was dry to the touch in 15 minutes. Half the panels were subjected to the standard saltspray resistance test and withstood 7500 hours The remaining coated panels were topcoated with a conventional polyurethane finish and subjected to the standard immersion test in water at 150° F. These panels passed 168 hours without formation of osmotic blisters. Adhesion and flexibility of the epoxy primer coating were excellent.

EXAMPLE 2

Two phases (A and B) of a coating composition in accordance with the invention were prepared by separately mixing the components set forth under (A) and (B) respectively, with the amounts expressed in percent bY weight based on the total weight after admixture.

| Phase A | |
|---|---|
| Polyester - XP - 631 | 11.69% |
| QM - 1007 | 4.51% |
| Strontium chromate | 16.70% |
| Crystalline silica - NOVAKUP 1250 (silane-treated silica) | 27.55% |
| Amorphous silica AEROSIL 300 | 2.50% |
| Solvent - Exxate 600 | 6.71% |
| Solvent - n - butyl acetate | 6.72% |
| Solvent - methylethyl ketone | 4.51% |
| Catalyst DABCO T-12 10% solution (dibutyltin dilaurate) | 0.04% |

| -continued | |
|---|---|
| Pot life extender 2-4 pentanedione | 0.06% |
| Phase B | |
| Urethane - Mobay N - 3200 | 16.20% |
| Solvent - methylpropylketone | 2.81% |

Phase A was prepared by mixing the first seven ingredients with very slow agitation in a pebble mill, with no heat applied. Thereafter, methylethylketone, T-12 and 2-4 pentanedione were added.

The two phases were then admixed in approximately a 3:1 proportion by weight of Phase A to Phase B. The admixture had a viscosity suitable for application by spraying. This urethane binder could be used either as a primer coat or a finish coat over an epoxy primer coat. Its properties were tested and found to exceed all requirements for aircraft use.

What is claimed:

1. A coating composition for the protection of substrates against environmental attack, comprising, in weight percent:
   from about 10% to about 30% of a film-forming polymer which is liquid at room temperature in the presence of not more than 25% by weight solvents;
   up to about 20% of a corrosion inhibiting agent selected from the group consisting of metal chromates, metal phosphates, metal molybdates, and mixtures thereof;
   from 2% to about 5.5% of an amorphous pyrogenic silica having an average particle size less than 0.01 micron;
   from about 20% to about 50% of a crystalline silica having an oil absorption value of less than 20 measured by ASTM standard test D281-84; and
   not greater than 25% of at least one solvent compatible with said polymer, said composition having a viscosity suitable for application of coatings by conventional equipment.

2. The composition of claim 1, wherein said film-forming polymer is an epoxy, phenoxy, urethane, vinyl chloride, acrylic, polyester, or alkyd type resin.

3. The composition of claim 1, wherein said corrosion inhibiting agent includes a chromate of at least one of cobalt, strontium, and barium, and zinc molybdate, in a total amount ranging from about 10% to about 20% by weight.

4. The composition of claim 1, wherein said film-forming polymer is a liquid epoxy resin, and including from about 5% to about 30% by weight of a crosslinking agent for said epoxy resin.

5. The composition of claim 4, wherein said solvent is selected from the group consisting of ketones, alcohols, esters, aromatic organic compounds, and mixtures thereof, in an amount less than 340 grams per liter of said composition.

6. The composition of claim 1, wherein said amorphous pyrogenic silica ranges from about 2.5% to about 5% by weight.

7. The composition of claim 1, wherein said crYstalline silica ranges from about 25% to about 45% by weight.

8. The composition of claim 1, wherein said film-forming polymer is a polyester, and including about 10% to about 20% by weight of a polyisocyanate crosslinking agent for said polymer.

9. A two component coating composition for the protection of substrates against environmental attack, said composition after admixture having a viscosity suitable for deposition of coatings by conventional equipment, comprising, in weight percent based on the total weight of the composition after admixture:
- from about 10% to about 30% of a film-forming epoxy polymer, said polymer being liquid at room temperature;
- from about 5% to about 30% of a crosslinking agent for said epoxy polymer;
- up to about 20% of a corrosion inhibiting agent selected from the group consisting of metal chromates, metal phosphates, metal molybdates, and mixtures thereof;
- from 2% to about 5.5% amorphous pyrogenic silica having an average particle size less than 0.01 micron;
- from about 20% to about 50% of a crystalline silica having an oil absorption value of less than 20 measured by ASTM standard test D281-84; and
- not greater than 25% of at least one organic solvent compatible with said epoxy polymer and said crosslinking agent.

10. The composition of claim 9, including up to 2% by weight of a coupling agent selected from the group consisting of silanes, organo-silicon compounds having an epoxy group, and mixtures thereof.

11. The composition of claim 10, including from about 0.1% to about 10% by weight, based on the weight of said epoxy polymer, of a catalyst to accelerate the reaction between said epoxy polymer and said crosslinking agent.

12. The composition of claim 9, wherein said amorphous pyrogenic silica ranges from about 2.5% to about 5% by weight.

13. The composition of claim 9, wherein said crystalline silica ranges from about 25% to about 45% by weight.

14. The composition of claim 9, wherein said corrosion inhibiting agent includes a chromate of at least one of cobalt, strontium, and barium, zinc molybdate, in a total amount ranging from about 10% to about 20% by weight.

15. The composition of claim 9, wherein said at least one solvent is selected from the group consisting of ketones, alcohols, esters, aromatic organic compounds, and mixtures thereof, in a total amount less than 340 grams per liter of said composition after admixture.

16. The composition of claim 9, wherein said crosslinking agent is a hardener selected from the group consisting of aliphatic polyamides, aromatic polyamides, aliphatic polyamines, aromatic polyamines, melamine, urea-formaldehyde, and mixtures thereof.

17. A two component coating composition for the protection of substrates against environmental attack, said composition after admixture having a viscosity suitable for deposition of coatings by conventional equipment, comprising, in weight percent based on the total weight of the composition after admixture:
- from about 20% to about 30% of an epoxy polymer having at least one epoxy function per molecule, the epoxy polymer being liquid at room temperature;
- from about 10% to about 20% of a polyamide crosslinking agent for the epoxy polymer;
- from about 10% to about 20% of a corrosion inhibiting pigment selected from the group consisting of cobalt chromate, strontium chromate, barium chromate, zinc molybdate, and mixtures thereof;
- from about 2.5% to about 5% of an amorphous pyrogenic silica having an average particle size less than 0.01 micron;
- from about 30% to about 45% of a crystalline silica having an oil absorption value of less than 20 measured by ASTM standard test D281-84;
- up to 2% of a coupling agent selected from the group consisting of a silane, an organo-silicon compound having an epoxy function, and mixtures thereof;
- up to 5% of a catalyst selected from the group consisting of an organometallic compound, an amine, a polyamine, and mixtures thereof; and
- from about 10% to less than 25% of volatile organic solvents selected from the group consisting of methylethylketone, methylpropylketone, methylisobutylketone, methylamylketone, cyclohexanone, butanol, isopropanol, toluene, xylene, and mixtures thereof.

18. A two component coating composition for the protection of substrates against environmental attack, said composition after admixture having a viscosity suitable for deposition of coatings by conventional equipment, comprising, in weight percent based on the total weight of the composition after admixture:
- from about 10% to about 30% of a film forming polyol-containing polyester;
- from about 10% to about 30% of an isocyanate polymer as a crosslinking agent, said polymer being liquid at room temperature in the presence of not more than 25% by weight solvents;
- up to about 20% of a corrosion inhibiting agent selected from the group consisting of metal chromates, metal phosphates, metal molybdates, and mixtures thereof;
- from 2% to about 5.5% of an amorphous pyrogenic silica having an average particle size less than 0.01 micron;
- from about 20% to about 50% of a crystalline silica having an oil absorption value of less than 20 measured by ASTM standard test D281-84; and
- not greater than 25% of at least one organic solvent compatible with said polyester and said isocyanate polymer.

19. The composition of claim 18, wherein said amorphous pyrogenic silica ranges from about 2.5% to about 5% by weight.

20. The composition of claim 18, wherein said crystalline silica ranges from about 25% to about 45% by weight.

21. A method for preparation of the coating composition claimed in claim 1 having a viscosity suitable for application by conventional equipment, comprising the steps of mixing the ingredients with very slow agitation in low shear milling equipment, limiting the temperature increase to a minimum, in the absence of additives which tend to increase viscosity, and adding highly polar hydrogen bonding solvents.

22. The method of claim 21, wherein said composition is a two component epoxy resin binder sYstem and wherein amorphous pyrogenic silica is added to the hardener phase along with a crosslinking agent and at least one of an alcohol and ketone as a solvent.

23. The method of claim 21 wherein said composition is a two component urethane/polyol resin binder system, and wherein amorphous pyrogenic silica is added to a polyol-containing phase along with at least one of an acetate, ketone and ester as a solvent.

* * * * *